United States Patent
Marshall

(10) Patent No.: US 8,767,071 B1
(45) Date of Patent: Jul. 1, 2014

(54) HIGH VOLTAGE POWER LINE MULTI-SENSOR SYSTEM

(75) Inventor: Patrick Marshall, Bellbrook, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 603 days.

(21) Appl. No.: 13/039,597

(22) Filed: Mar. 3, 2011

(51) Int. Cl.
  *H04N 7/18* (2006.01)

(52) U.S. Cl.
  USPC .............................. 348/144; 348/169; 320/108

(58) Field of Classification Search
  None
  See application file for complete search history.

(56) References Cited

U.S. PATENT DOCUMENTS

| | | | |
|---|---|---|---|
| 4,801,937 A | 1/1989 | Fernandes | |
| 4,891,744 A | 1/1990 | Yamamoto et al. | |
| 4,904,996 A | 2/1990 | Fernandes | |
| 4,926,227 A * | 5/1990 | Jensen | 257/467 |
| 5,539,300 A | 7/1996 | Mathieu | |
| 6,320,772 B1 | 11/2001 | Doyama et al. | |
| 6,496,391 B1 | 12/2002 | Ikeda et al. | |
| 6,677,743 B1 | 1/2004 | Coolidge et al. | |
| 6,756,776 B2 | 6/2004 | Perkinson et al. | |
| 6,924,732 B2 | 8/2005 | Yokoo | |
| 7,318,564 B1 * | 1/2008 | Marshall | 244/58 |
| 7,398,946 B1 | 7/2008 | Marshall | |
| 7,510,142 B2 * | 3/2009 | Johnson | 244/17.17 |
| 7,543,780 B1 | 6/2009 | Marshall et al. | |
| 7,563,124 B1 | 7/2009 | Marshall et al. | |
| 8,167,234 B1 * | 5/2012 | Moore | 244/17.25 |
| 8,229,163 B2 * | 7/2012 | Coleman et al. | 382/103 |
| 2010/0084920 A1 | 4/2010 | Banting et al. | |
| 2010/0253318 A1 | 10/2010 | Thomas, Sr. | |

OTHER PUBLICATIONS

De Souza et al., "Inspection Robot for High Voltage Transmission Lines" ABCM Symposium in Mechatronics, vol. 1, pp. 1-7 (2004).

* cited by examiner

*Primary Examiner* — Christopher S Kelley
*Assistant Examiner* — Christopher Findley
(74) *Attorney, Agent, or Firm* — AFMCLO/JAZ; Jeffrey Moore

(57) ABSTRACT

A multi-sensor system can be attached to a high voltage power line, draw power from the power line inductively, and convert the power to lower voltages and direct currents for operating cameras, sensors, a processor, and communications equipment that provide persistent intelligence, surveillance, and reconnaissance capabilities. The multi-sensor system can detect and track targets in detection regions and transmit such detection data and other data from the camera and sensors to a remote operator who can initiate response actions and send control instructions to the multi-sensor system from the remote location.

17 Claims, 7 Drawing Sheets

HIGH VOLTAGE POWER LINE MULTI-SENSOR SYSTEM

RIGHTS OF THE GOVERNMENT

The invention described herein may be manufactured and used by or for the Government of the United States for all governmental purposes without the payment of any royalty.

BACKGROUND OF THE INVENTION

The intelligence, surveillance, and reconnaissance domain has a great demand for real time acoustic and image processing systems that operate reliably 24 hours a day, 7 days a week, 365 days a year. Moreover, as the Global War on Terror continues, civilian and military operations have to shift towards countering and possibly neutralizing enemy asymmetric forces. These forces take the form of snipers, ambushers, improvised explosive devices, drug smugglers, saboteurs, and the like. Unfortunately, existing tools and technologies were not designed to operate against forces that hide amongst civilian populations and employ non-conventional weapons and tactics. The significance of this problem is that terrorists armed with simple, even improvised, anti-personnel weapons can achieve tactical and political objectives against vastly superior conventional forces. These terrorists operate in urban settings and rural areas.

One broad strategy to counter these asymmetric threats is the use of innovations such as remote sensor systems. However, most available sensor systems have two primary drawbacks: (1) limited power and (2) limited line-of-sight communications. These drawbacks limit the effectiveness of such systems. Power limitations limit the ability of these systems to operate reliably and provide round-the-clock surveillance 24 hours a day, 7 days a week, 365 days a year (i.e., 24/7/365). Existing line-of-sight communications limitations reduce the ability of such systems to transmit sensor data to remotely-located end users in an effective manner. Thus, there is a need to overcome these limitations while providing the Department of Defense and others with round-the-clock or "24/7/365" persistent intelligence, surveillance and reconnaissance (P-ISR) support and similar capabilities.

Governments and businesses also need to monitor their facilities and operations 24/7/365 in urban and rural settings. Government infrastructure facilities such as water treatment facilities, power plants, laboratories, and the like may be targets for terrorist attacks. Similarly, oil pipelines, power grids, warehouses, factories, laboratories, and the like in the commercial sector may be targeted by terrorists or persons engaging in industrial espionage and sabotage. When these facilities are remotely located, the limited or nonexistent power sources in the area may prevent or severely restrict the employment of cameras, sensors, and other ISR devices. In other urban or rural settings, line of sight communications and visibility in areas to be monitored may be reduced. As a result, there is a need to overcome these limitations and provide governments and businesses with readily-deployable, versatile, durable, configurable devices and systems that can provide round-the-clock or "24/7/365" P-ISR support and capabilities.

SUMMARY OF THE INVENTION

The High Voltage Power Line Multi-Sensor (HVPM-S) Systems disclosed herein provide a remotely operated and controlled system that can be deployed around the world and operate and survive 24/7/365 to provide P-ISR capabilities. The systems address the limited power problem by drawing electrical power from available high voltage power lines inductively and powering cameras, sensors, processors, and communications equipment. Thus, the HVPM-S systems can harvest energy directly from the power lines 24/7/365, thereby overcoming the limited power drawback of other sensor systems and can operate indefinitely using available power lines as the primary power source and also can store power if necessary.

The disclosed HVPM-S systems also overcome the problem of limited line-of-sight communications by incorporating cell phone, satellite, or other communications technology that is accessible world-wide such as "Broadband over Power Line (BPL)" technologies. The prevalence of cell phone towers, even increasingly in third world countries, enables the use of commercial off the shelf (COTS) data cell phone technology to relay wireless communication and control information between a HVPM-S system and an operator's remote base station. This capability allows users to monitor any area of interest indefinitely without having to tether cables or replace batteries. In addition, other public and private communications networks, including satellite communications networks, BPL technologies, and the like, may be used to transmit data and control information between HVPM-S systems and remote locations and operators base station and a HVPM-S system.

Each HVPM-S system is designed to be modular and configurable with different cameras, microphones, sensors, processors, communications equipment, and other devices to support any mission. HVPM-S systems may include a visible/near-IR video camera that enables remote security specialists to monitor and detect threats safely from a distance. The systems can include microphones for audio detections of various acoustic threats such as gun shots, ultra light flyovers, and the like and speakers for two-way audio communications. HVPM-S systems can use any of a wide variety of sensors including, for example, vibration, magnetic, acoustic, metal, nuclear, chemical, biological, infrared, heat, motion, sound, and other sensors. They can be disguised to appear as standard power line equipment such as insulators, splices, and the like that are commonly seen on power lines. HVPM-S systems can be installed in minutes and provide 24/7/365 P-ISR capabilities for brief periods or periods of a year or more depending on mission requirements.

A multi-sensor system comprises a latching mechanism that includes a stationary core, a movable core, a stationary core housing attached to the stationary core, a movable core housing attached to the movable core, and an actuator connected to the stationary core housing and the movable core housing, wherein the stationary core housing is movably attached to the movable core housing and the actuator can be operated to move the movable core toward the stationary core for securing the multi-sensor system to a power line so the stationary core and/or the movable core can draw electrical power from the power line inductively; and a sensor housing connected to the latching mechanism wherein the sensor housing houses a camera and one or more sensors, a communications device for transmitting data to and receiving control information from a remote location via a communications network, a processor for controlling the camera, sensors, and communications device, and a power system for converting electrical energy drawn inductively from the power line to a lower direct current voltage for powering the camera, sensors, communications device, and processor.

A method of providing persistent intelligence, surveillance, and reconnaissance comprises attaching the multi-sensor system of claim 1 to a power line; drawing electrical power from the power line inductively; converting the electrical power from the power line to a lower voltage and direct current; and powering a camera, sensors, a processor, and communications equipment to provide persistent intelligence, surveillance, and reconnaissance for up to 24 hours a day, seven days a week, and 365 days a year within the area around the multi-sensor system.

DETAILED DESCRIPTION

Figure 1:
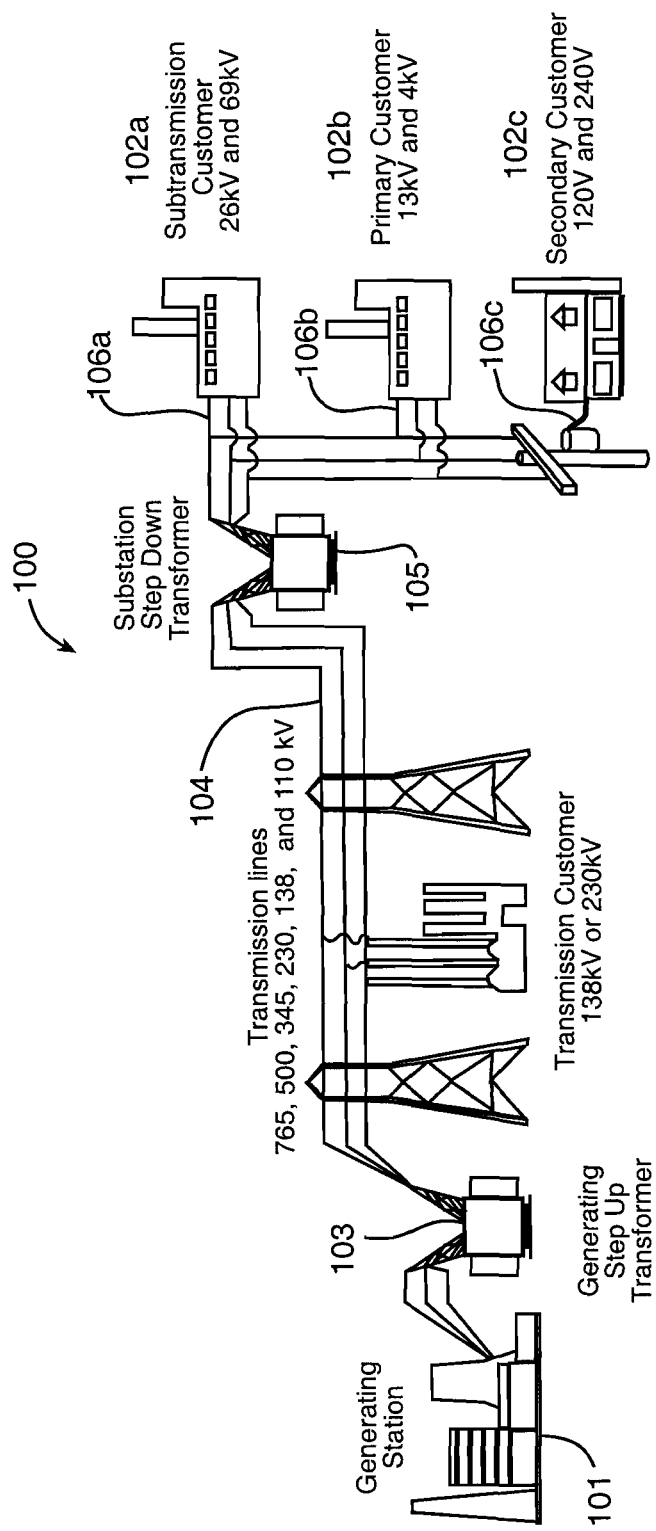
FIG. 1 depicts a common electric distribution system.
Figure 2:
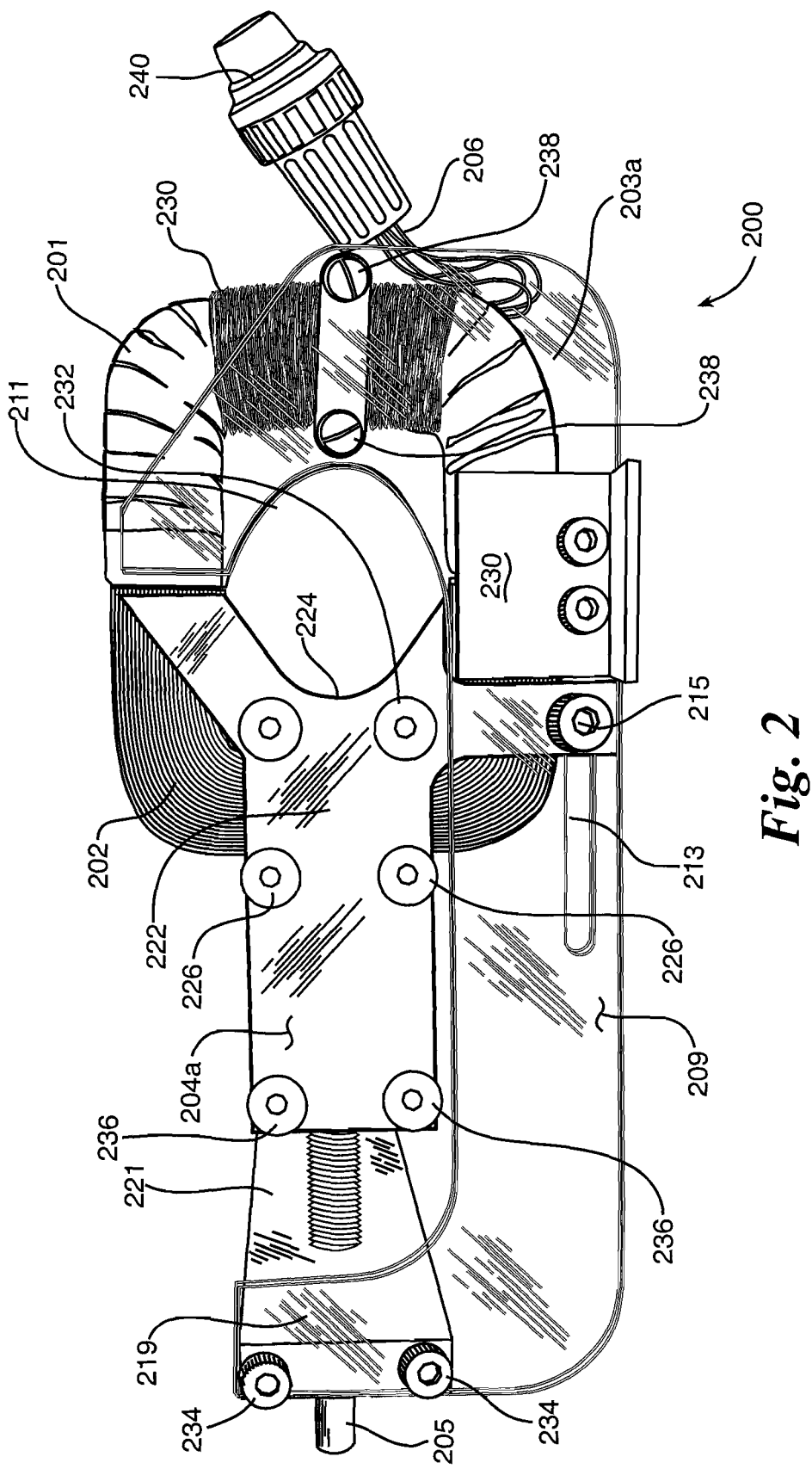
FIG. 2 is a side view of a latching mechanism in a closed position.
Figure 3:
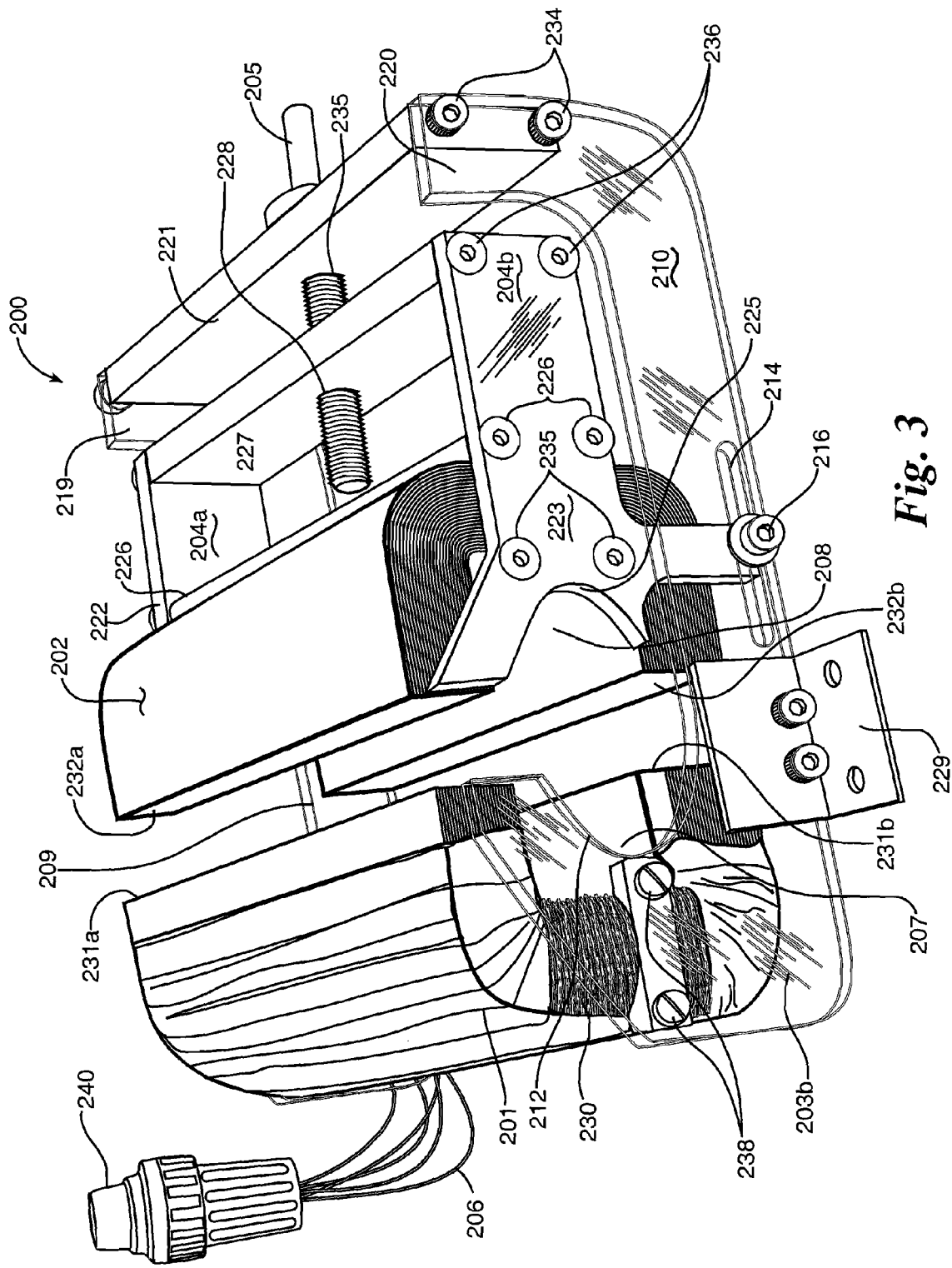
FIG. 3 is a side perspective of a latching mechanism in a partially open position.
Figure 4:
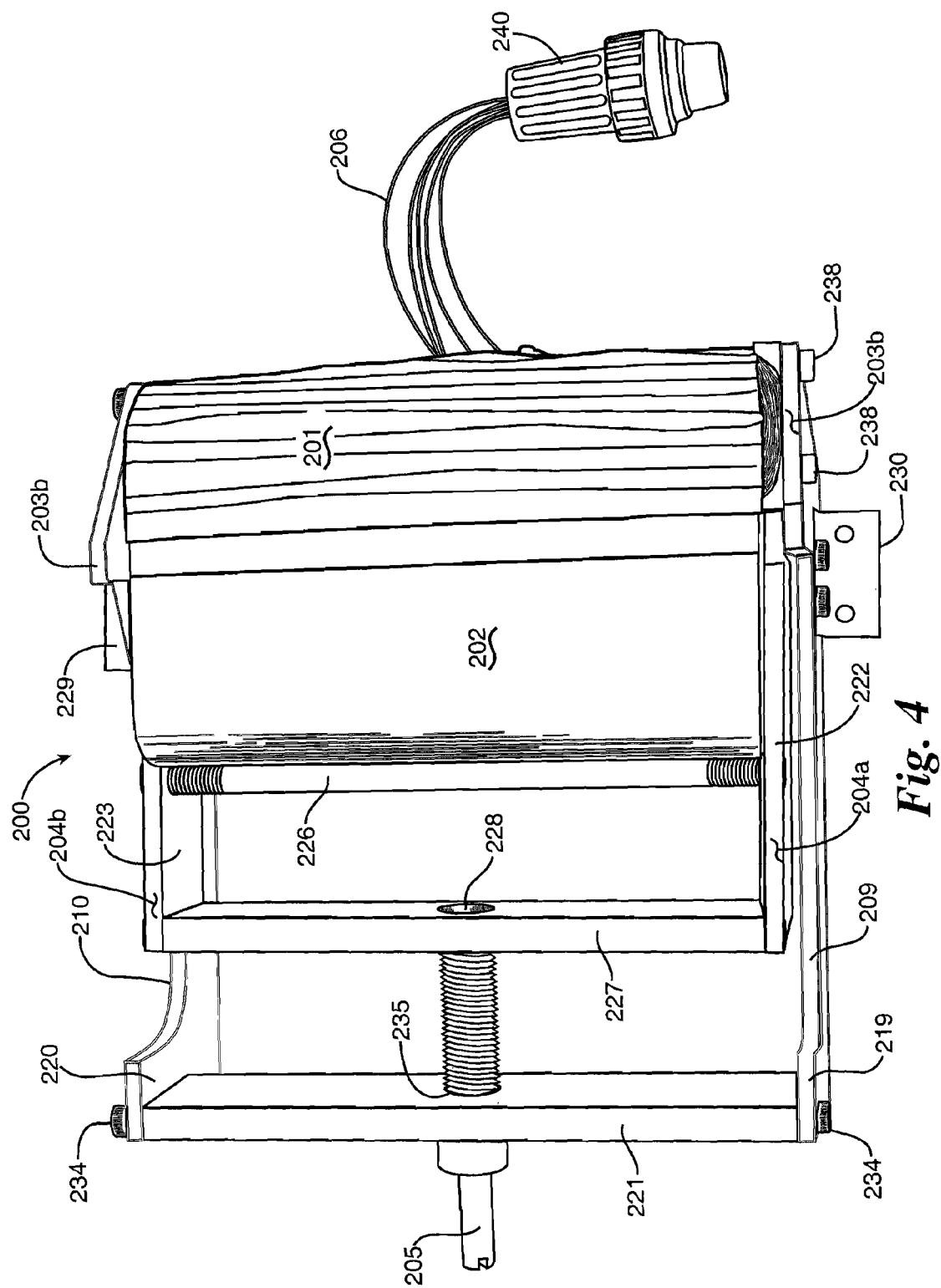
FIG. 4 is a top view of a latching mechanism in a closed position.
Figure 5:
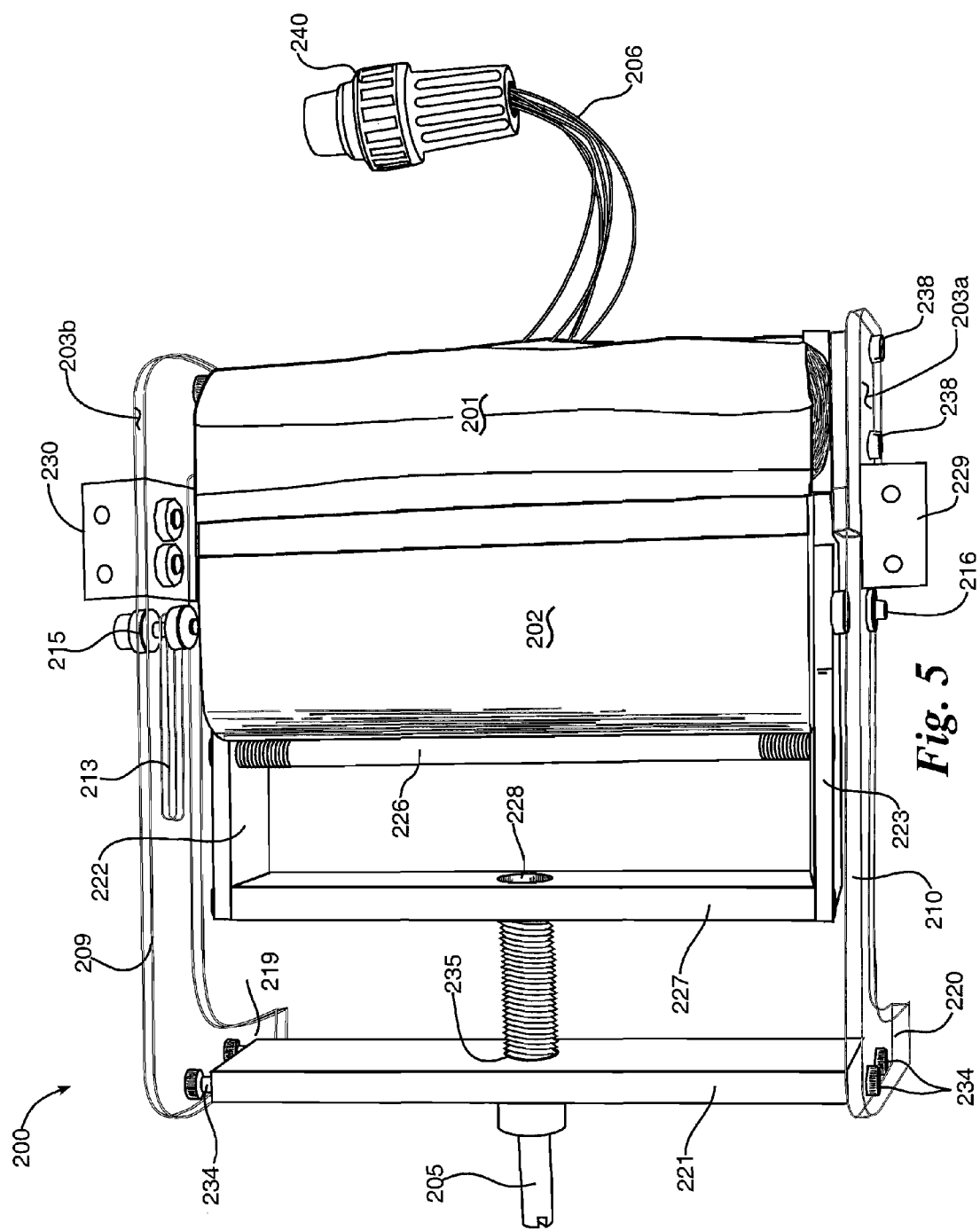
FIG. 5 is a bottom view of a latching mechanism in a closed position.
Figure 6:
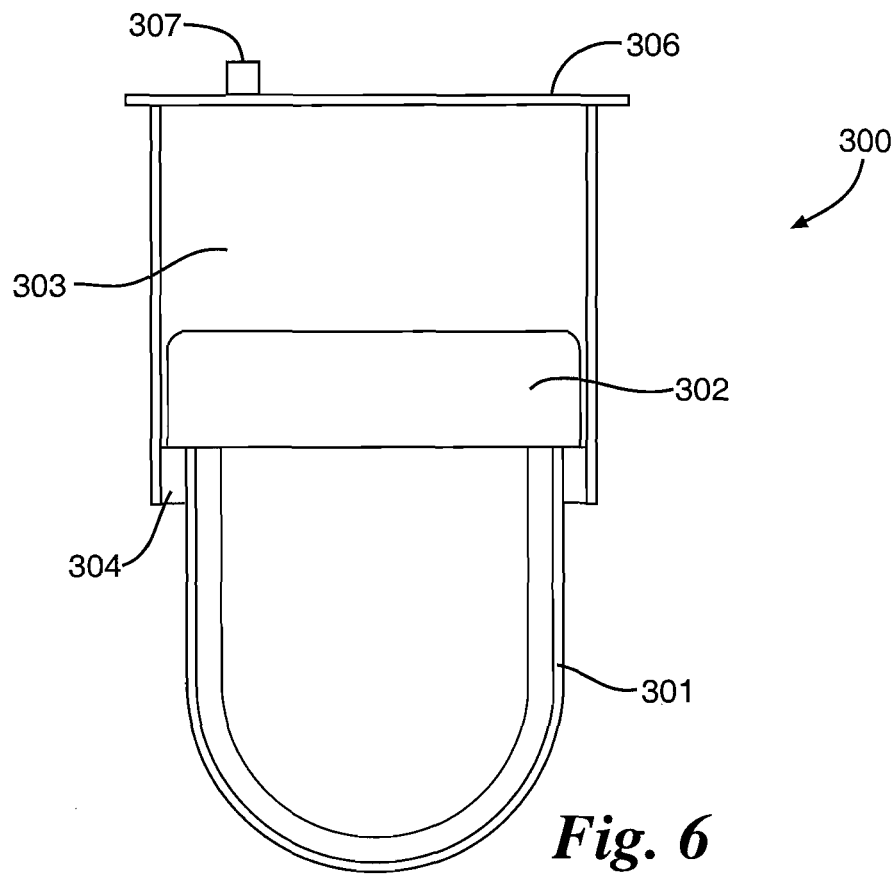
FIG. 6 shows a sensor housing.

FIG. 1 depicts an electric distribution system 100 that distributes electricity from a generating station 101 or other power source to customers 102a, 102b, 102c. The system 100 includes a step up transformer 103, high voltage (HV) transmission lines 104, and a step down transformer 105. The HV transmission lines 104 typically are not covered by insulation. The conductive material of the HV transmission lines 104 is typically an aluminum alloy material that comprises several strands and may be reinforced with steel strands for added strength and durability. Copper may be used in overhead transmission lines, but aluminum is much more common because it is lower in weight for equivalent performance, and typically lower in cost. Overhead HV transmission lines 104 are a commodity supplied by several companies worldwide. Improved conductor material and shapes are regularly used to increase capacity and modernize transmission circuits. HV transmission line 104 conductor sizes range from around 12 mm$^2$ (#6 Gage) to 750 mm$^2$.

For transmission over long distances, electricity is stepped up and transmitted at higher voltages such as 110 kV, 138 kV, 230 kV, 345 kV, 500 kV, 765 kV and greater, via the step up transformers 103, to reduce the energy loss in transmission. Power is usually transmitted as an alternating current through overhead HV transmission lines 104. Underground power transmission lines are used only in densely populated areas because of the higher cost of installation and maintenance compared to overhead HV transmission lines 104, and the difficulty of voltage control on longer cables. At an end user or customer location, the high voltages are stepped down via the step down transformer 105 to lower voltage power lines 106a, 106b, 106c. Some customers 102a may receive a stepped down voltage 106a in the 26 kV to 69 kV range. Other primary customers 102b, such as factories and businesses, receive a stepped down voltage in the 13 kV to 4 kV range. Secondary customers 102c such as consumers and residential homes receive a stepped down voltage in the 120V to 240V range. The HVPM-S systems disclosed herein typically use a stepped down voltage above 240V from single-conductor transmission lines. However, HVPM-S systems can be configured to operate on other voltages in addition to those provided in the lower voltage power lines 106a, 106b, 106c.

In one configuration, a HVPM-S system comprises a latching mechanism 200 and a sensor housing 300. As described in more detail below, the sensor housing 300 is secured to the latching mechanism 200, which is attached to a voltage power line to. As shown in FIGS. 2-5, the latching mechanism 200 comprises a stationary core 201 with one or more magnetic core wire windings 230, a movable core 202, a stationary core housing having two main portions 203a, 203b, a movable core housing having two main portions 204a, 204b, an actuator 205, and a power cord 206. The movable core housing 204a, 204b and the stationary core housing 203a, 203b should be manufactured from non-conductive material to prevent shorting the ends of movable core 202 and the stationary core 201. The stationary core 201 and movable core 202 comprise an inductive split-core and housing. The stationary core 201 and the movable core 202 have a generally elongated shape with respective core faces 231a, 231b and 232a, 232b that are separated by a respective channel 207, 208 within each respective core 201, 202. The core faces 231a, 231b, 232a, 232b may be covered with a thin layer of electrically-conductive material, such as a gold-plated layer that improves conductivity and resistance to the environment. In addition, rubber boots or other form-fitting material may inserted around the outer edges of each core face 231a, 231b, 232a, 232b to provide a weather-tight seal. High-temperature conductive grease may be applied to the core faces 231a, 231b, 232a, 232b to provide further protection from the elements. When the latching mechanism 200 is attached to a power line, the power line extends along the inner channels 207, 208 of the stationary core 201 and movable core 202.

The stationary and movable cores 201, 202 are movably connected and maintained in proper orientation relative to one another by the stationary core housing 203a, 203b and the movable core housing 204a, 204b. The stationary core housing 203a, 203b is attached to respective sides of the stationary core 201 via pins, bolts, or other fasteners 238 and comprises two generally elongated sections 209, 210. Each elongated section 209, 210 has a cut-out 211, 212 at one end where the stationary core housing 203a, 203b attaches to the stationary core 201. The cut-outs 211, 212 conform generally to shape of the inner channel 207 of the stationary core 201. When the latching mechanism 200 is attached to a power line, the cut-outs 211, 212 engage around the power line and maintain it in alignment within the inner channel 207 of the stationary core 201. Each elongated section 209, 210 also includes a slot 213, 214 for receiving a pin 215, 216 that extends from a respective movable core housing 204a, 204b. Each pin 215, 216 slides within a respective slot 213, 214 to enable the movable core 202 and movable core housing 204a, 204b to move relative to the stationary core 201 and stationary core housing 203a, 203b. Each stationary core housing 203a, 203b has a lower portion 219, 220 at a respective end opposite to the cut-outs 211, 212. An actuator support 221 is attached to the lower portions 219, 220 via pins, bolts, or other suitable fasteners 234, and extends between the lower portions 219, 220. The movable core housing 204a, 204b includes two generally elongated portions 222, 223 that are attached to respective sides of the movable core 202 via inner support pins, bolts, or other suitable fasteners 235. Each elongated portion 222, 223 includes a cut-out 224, 225 that engages around a power line and maintains the power line within the inner channel 208 of the movable core 202 when the movable core 202 is moved to the stationary core 201 to attach the latching mechanism 200 to a power line. The movable core housing 204a, 204b also includes two outer support pins, bolts, or other suitable fasteners 226. The outer support pins 226 and the two inner support pins 235 extend between the elongated portions 222, 223 along outer and inner surfaces of the movable core 202 and secure the movable core 202 to the movable core housing 204a, 204b. The distal ends of each movable core housing 204a, 204b opposite to the cut-outs 224, 225 are connected to an actuator guide 227, via pins, bolts, or other suitable fasteners 236. The actuator guide 227 includes an aperture 228 for receiving the actuator 205. The aperture 228 is aligned with an aperture 235 in the actuator support 221 of the stationary core housing 203a, 203b. The actuator 205 may be any desired configuration such as a threaded actuator (shown in FIGS. 2-5) that is rotatably attached to the actuator support 221 and engages inner threads in the aperture 228 of the actuator guide 227 to move the movable core 202 toward or away from the stationary core 201. The pins 215, 216 that extend from the elongated portions 222, 223 of the movable core housing 204a, 204b are slidingly disposed in the slots 213, 214 of the elongated portions 209, 210 of the stationary core housing 203a, 203b. The pins 215, 216 are fixedly connected to the movable core housing 204a, 204b and slide within the slots 213, 214 of the stationary core housing elongated portions 209, 210 to enable the movable core 202 and movable core housing 204a, 204b to move relative to the stationary core 201 and the stationary core housing 203a, 203b and maintain alignment of the stationary core 201 and the movable core 202 as the latching mechanism 200 opens and closes. Persons skilled in the art will appreciate that other actuators may be used including spring-biased latches that can be locked into a retracted position to maintain the movable core 202 apart from the stationary core 201 and then released to move the movable core 202 toward the stationary core 201 and secure the power line between the cut-outs 211, 212 of the stationary core housing 203a, 203b and the cut-outs 224, 225 of the movable core housing 204a, 204b. The stationary core housing 203a, 203b further includes brackets 229, 230 for attaching the latching mechanism 200 to the sensor housing 300. This may be done, for example by attaching the latching mechanism 200 to a top plate 306 of a sensor housing 300 via pins, bolts, or other suitable fasteners. Other means of securing the latching mechanism 200 to the sensor housing 300 may be used. Depending on the configuration of the sensor housing 300, additional brackets or other means may be used to connect the latching mechanism 200 to the sensor housing 300. The wire ends of the wire coil 230 are electrically connected through the power cord 206 which extends from the windings around stationary core 201 to the pins of an adapter or receptacle 240 which can be connected to a receptacle 307 of a sensor housing 300 to provide power for a camera, sensors, processors, communications equipment, and other ISR equipment and devices contained within the sensor housing 300, as describe in more detail below.

In operation, the actuator 205 is used to open the latching mechanism 200 so the stationary core 201 and movable core 202 are far enough apart to permit the latching mechanism 200 to be positioned around a power line. The latching mechanism 200 is positioned on the power line so the cut-outs 211, 212 of the stationary core housing 203 can engage the power line with the power line positioned within the inner channel 207 of the stationary core 201. Once the latching mechanism 200 is positioned on the power line in the proper orientation, the actuator 205 can be used to close the latching mechanism 200 by moving the movable core 202 toward the stationary core 201 so that the cut-out portions 224, 225 of the movable core housing 204a, 204b are positioned around the power line and the power line is positioned within the inner channel 208 of the movable core 202. The core faces 231a, 231b of the stationary core 201 and the core faces 232a, 232b of the movable core 202 contact one another in a fully closed configuration. When the adapter 240 is connected to the receptacle 307 on the sensor housing 300, the stationary and movable cores 201, 202 can draw electrical power inductively from the power line to power cameras, sensors, processors, communications, surveillance, and other electronic equipment and devices in the sensor housing 300, as described in more detail below.

Figure 7:
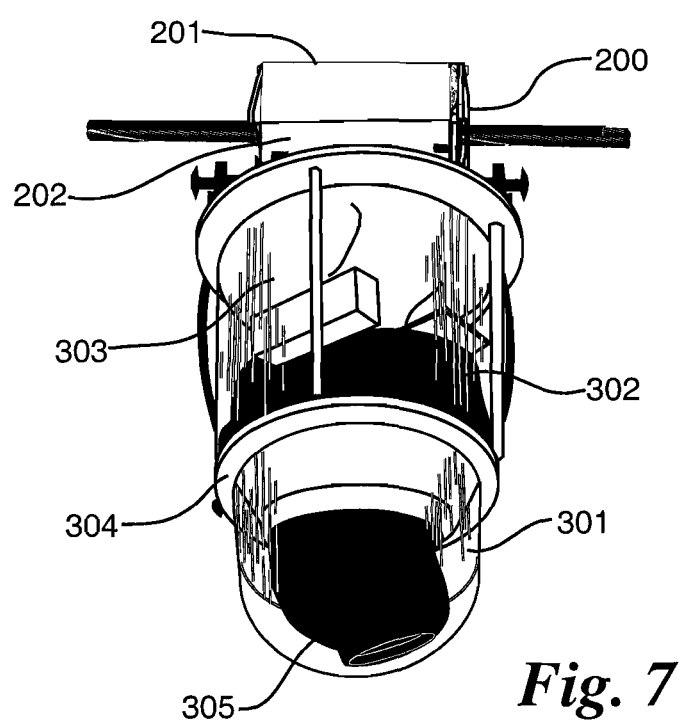
FIG. 7 shows a latching mechanism and sensor housing attached to a power line.

Once the latching mechanism 200 is attached to the sensor housing 300 and the assembly is attached to a power line, as shown in FIG. 7, the latching mechanism 200 provides a support and power source for electronics components in the sensor housing 300. The sensor housing 300 comprises a dome 301, an electronics housing 302, a power and communications housing 303, a lip 304, a top plate 306, and a power receptacle 307. The dome 301 houses one or more cameras, such as a pan tilt zoom (PTZ) camera 305, and other ISR surveillance devices such as microphones, sensors, and the like. The dome 301 is a durable transparent material such as plexiglass, fiber-reinforced composites, silicones, transparent ballistic glass, polyurethanes and other polymers, or other materials that provide a clear field of view for the camera 305 and sensors positioned within the dome 301. The dome 301 may be sealed and filled with nitrogen to prevent visible obscurations (e.g., clouding, fogging) that could degrade the optical performance of the camera 305. Active components, such as small electric fans and heater elements, also may be used for this purpose. The electronics housing 302 contains electronics for the camera 305, microphone, sensors, and other ISR and electronics devices positioned within the dome 301. The power and communications housing 303 includes electronics to convert higher voltage alternating current received from the latching mechanism 200 to lower voltage direct current to power the camera, microphone, sensors, processor, and other ISR devices positioned within the dome 301 as well as the communications electronics that enables remote control and monitoring of the environment around the sensor housing 300 and transmits data from the camera 305, microphone, sensors and other ISR devices to a remote location for collection, analysis, and action. The communications devices may include a cellular modem or cellular phone link that connects to a cellular network and provides broadband and Internet capabilities if available. They may include a SATCOM or similar link to a satellite communications network. The communications devices may link to other networks such as the Internet to facilitate transmission and receipt of data and control information from remote locations around the world. Depending on the accessibility of existing communications networks in an area of interest, one sensor housing 300 may connect to a cellular, satellite, or other communications network and serve as a hub for other HVPM-S systems in the area. This may be accomplished by including a WiFi or other router in the one sensor housing 300. One suitable router is the Cradlepoint Technology CTR350 Mobile Broadband Travel Router that has a wireless 802.11b/g router that can be used with a 3G cellular USB modem to provide secure Internet access from any remote location. Persons skilled in the art will appreciate that many other routers and communications devices may be used to provide similar capabilities for the HVPM-S system depending on the networks that are accessible in the area of interest. The lip 304 prevents rain and other precipitation from running off of the sensor housing 300 and obscuring the dome 301 and the camera 305.

The latching mechanism 200 remains exposed to the environment to passively cool the stationary and movable cores 201, 202. Excessive current in the power line may generate amplified magnetic fields which may cause the stationary and movable cores 201, 202 to enter into saturation. This condition may cause excessive overheating of the secondary coils which in turn, heats the stationary and movable cores 201, 202, raising a need for passive cooling. Electric fans and the like also may be used for active cooling of the stationary and movable cores 201, 202.

Figure 8:
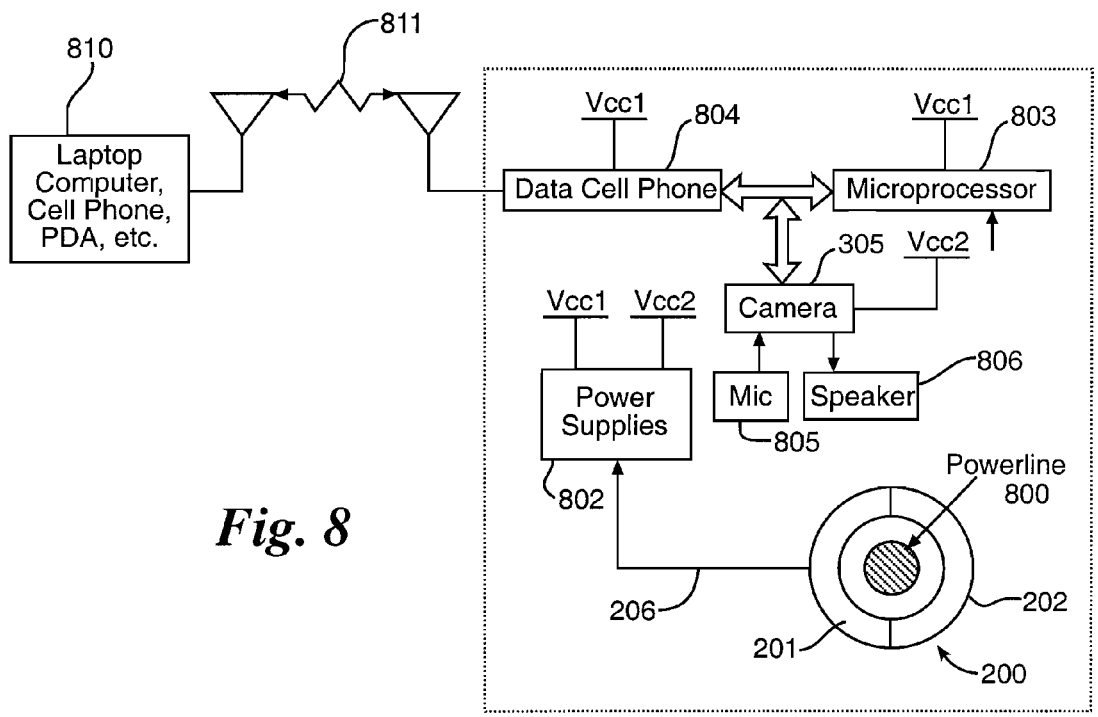
FIG. 8 is a block diagram of an electrical and communications system.

As shown in FIG. 8, the electronics of an HVPM-S system may be configured as follows. When the latching mechanism 200 is attached to a power line 800, as described above, the stationary and movable cores 201, 202 draw electrical energy inductively from the power line 800. This energy is inductively coupled to the power supply 802 via secondary coils 231 that are wound around one of the split cores, either the stationary core 201, as shown in FIGS. 2-5, or the movable core 202. The secondary coils 231 can have two different core windings $N_1$, $N_2$ that output two different secondary voltages. Metal oxide varistors (MOVs) can be inserted between the terminals of each secondary core winding $N_1$, $N_2$ for overvoltage protection so the power supply 802 and system are not damaged by excessive voltages or surges. One suitable MOV is a varistor sold by Littlefuse, Inc. as part number V430MA7B. The secondary coils 231 are connected to separate AC-to-DC converters in the power supply 802 to convert the stepped-down voltages and alternating currents to direct currents and voltages for operating the camera, sensors, processor, communications, and surveillance equipment in the sensor housing 300. Two regulators within the power supply 802 output two separate voltages (Vcc1 and Vcc2) based on the different secondary coil core windings $N_1$, $N_2$. One voltage Vcc2 powers the camera 305, sensors, and surveillance equipment while the other voltage Vcc1 powers the processor 803 and cell phone 804. For example, one of the secondary coil core windings $N_1$ can produce a voltage that is stepped down to 12 V to operate the camera, microphone, and other sensors, while the other secondary coil core windings $N_2$ can produce a stepped down voltage of 5 V for the processor, cellular modem, and communications equipment. If additional voltages are required, additional secondary coil windings $N_n$ and power supplies may be used. The cell phone 804 can be any suitable cellular modem or device that enables communications over cellular networks including, for example, Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN), as appropriate depending on the area in which the sensor housing 300 is deployed. Alternatively, the cell phone 804 can comprise a satellite communications device to provide communication over a satellite network, or another suitable communication device to provide communications over available networks. The camera 305 may include a microphone 805 and speaker 806 that provide "Two-Way Audio" capability and real-time transmission of audio to and from a laptop, personal computer, cell phone, PDA, or other computing device 810 at a remote location. This capability enables administrators to listen to and make announcements within the area around the sensor housing 300. In addition, a remote operator can utilize local software to discriminate the incoming audio to identify for example, gunfire and other acoustic events of interest. Acoustic signature recognition and identification software algorithms analyze the spectral content of the sound, its envelope, and other heuristics to distinguish and correctly classify impulsive sounds such as gunfire. Standard triangulation methods can be used to locate the source of the gunshot once it has been recognized as a gunshot and another HVPM-S systems pick up the same signatures. The communications link 811 from the camera 305 and other equipment in the sensor housing 300 to the remote computer 810 may be a cellular network, a satellite network, or another suitable network such as the Internet that can be accessed by the remote computer 810 anywhere in the world. The HVPM-S system also includes a switch such as a push button switch (not shown), that temporarily shorts the connection of the secondary coil windings $N_1$, $N_2$ to the power supply 802 to facilitate installation and removal of the latching mechanism 200 from a power line 800. Shorting the secondary coil ends $N_1$ and $N_2$ prevents the cores 201, 202 from acting as an electromagnet, which is critical during the installation and removal process of the HVPM-S system. Once the HVPM-S system has been installed and operated, shorting the system via the switch causes the magnetic flux in the cores to cease and enables the core halves to be moved apart for removal of the system. The switch may be a push button or other switch that can short the secondary coils $N_1$, $N_2$ in the power supply 802. In addition, the HVPM-S system may include a battery or other storage device to store electrical power from the power line 800.

The camera 305 includes a wide pan and tilt range and field of view feature that provides full 360° horizontal coverage, and a large optical zoom capability that provides intricate details on objects even at great distances. It has an auto focus feature that places objects in the foreground and background in focus during panning, tilting, or zooming. It also has a large horizontal field of view allowing for monitoring of larger areas. The image stabilization feature of the camera 305 compensates for blur caused by shaking of the camera 305 due to vibration and movement of a power line from wind and other forces. The camera's 305 progressive-scan CCD technology captures noiseless, high-quality video of moving subjects. Firmware inside the camera 305 incorporates dark image control so that if the background of an image is too bright to see main subjects, the remote operator can adjust the contrast of the darker areas to make it easier to see. The camera also has a powerful microprocessor that performs all image processing and encoding, resulting in simultaneous data distribution with no loss in frame rate. Image capture can be delivered in M-JPEG and/or MPEG-4 color video even in very low lux illumination conditions. The auto day/night mode switches automatically for variable lighting conditions. The camera also has a built-in motion detection and auto-tracking" firmware algorithms so that, when motion is detected, the camera can follow the subject's movement and automatically send an image to a cell phone, email address, or remote operator via the network 811. Each of these features of the camera 305 may be controlled remotely by an operator via the communications link 811. A suitable camera is a Canon VB-C60 or comparable device. Other cameras may be used depending upon the capabilities and features desired for monitoring an area of interest such as infrared, night vision, and other capabilities. Other sensors and ISR devices may be placed in the sensor housing 300 and powered by the power supply 802. If more than two working voltages are desired, additional secondary coil windings may be used to produce those additional voltages for other devices.

Figure 9:
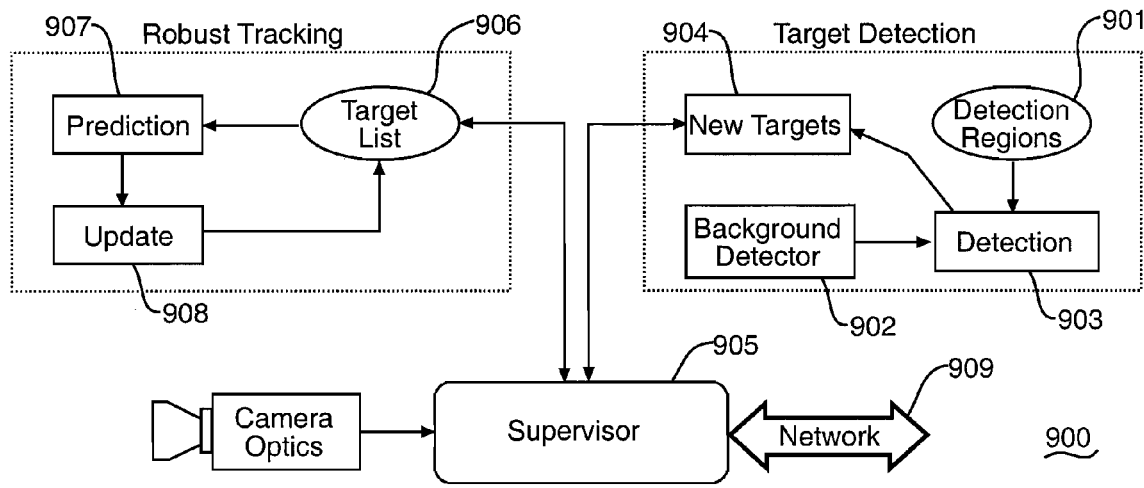
FIG. 9 is a block diagram of detection and tracking software.

The camera 305 includes a detection and tracking program 900 for monitoring the environment around the camera 305. As shown in FIG. 9, the detection and tracking software 900 includes target detection and robust tracking programs. These programs may be firmware in the camera 305 or customized programs loaded onto the microprocessor 803 prior to a mission. The target detection program has detection regions 901, a background detector 902, detection 903, and a new targets 904 feature. The detection regions 901 can be preset or programmed into the target detection software for a particular environment to be monitored. This can be done remotely or at the area of interest. Detection regions 901 may include any feature, structure, object or item to be monitored such as a tripwire, fence, door/entrance, building, security feature, or secured item to be monitored. When the latching mechanism 200 and sensor housing 300 are installed on a power line, one or more detection regions 901 may be recorded and preset in the tracking and detection program 900. Additional detection regions 901 may be added by a remote operator via the communications link 811. The background detector algorithm 902 records the terrain and environment around each detection region 901 so the background noise around each detection region 901 is removed to ensure a target is accurately detected and false positive detections are reduced or eliminated. When a potential target detection occurs at a detection region 901, the target detection software 903 uses the background detector algorithm 902 to determine if a target has in fact been detected in a detection region 901. If the target detection software 903 determines that a target has been detected, it adds the target to a list of new targets 904. It also raises an interrupt or flag in the tracking and detection program. The new target 904 is transmitted to the software supervisor 905, which decides whether to add the new target 904 to a target list 906 in the robust tracking program. The supervisor 905 also transmits the new target 904 data via an Ethernet or other network connection 909 to a cellular modem, satellite link, or other communication device for transmission over a cellular, satellite, or other communications network 811 to a remote location and operator who can review and monitor the target. The supervisor 905 also decides whether to add a new target 904 to the target list 906 and track it with the robust tracking program. The supervisor 905 includes a feature to permit manual override or input from a remote operator. The supervisor 905 also provides notification of the new target via the network link 909 and communications link 811 to a remote operator who may dispatch security personnel, UAVs, or other persons and equipment to the detection region 901 to assess the situation. Notification may include images or other data defining the detected target to enable a remote user or operator to evaluate the target. For example, motion detection or other target detection sensors such as sound, heat, biological, nuclear, and the like can send an email or similar notification from the detection and tracking software 900 to a remote operator or remote location for analysis and action. Such notification can include photographs or other data for a remote operator or persons to analyze. In either case, if a new target 904 is added to the target list 906 of the robust tracking program, the tracking program performs a predictive algorithm or routine 907 on the new target to predict where the target will move to or be located next. The new target location is then updated 908 and this information is fed back into the target list 906. A new prediction 907 is made and further updates 908 occur so the new target can be continually tracked or until the supervisor 905 instructs the robust tracking program to drop the target from the target list 906 and stop tracking it. If the target moves out of range of the camera 305 or cannot be monitored, the target list 906 is updated and the supervisor 905 is notified of the change to the target list 906 and alerts the remote operator of this change.

While one of the principal uses of these systems is to support P-ISR type missions which are critical to defeating threats that endanger our forces and borders, the disclosed HVPM-S systems can be used in a wide variety of environments including remote monitoring of utilities, mining, government and private facilities and the like. The ease of installation and use of the HVPM-S systems makes them ideal for military and civilian applications. The systems may be installed in as little as five minutes and provide persistent 24/7/365 ISR monitoring of an area or facility with feeds to remote locations by drawing power inductively from power lines and using that power to provide persistent ISR, communications, and control. These capabilities enable remote operators to monitor areas of interest indefinitely without having to run cables or replace batteries or other power sources. The systems can include rechargeable batteries and recharge those batteries indefinitely using the power line as a power source. Remote monitoring improves safety for operators and facilitates control of response actions. The HVPM-S system is modular and configurable with a multitude of sensors and other devices. It can support multiple visible, infrared, audio, and other sensors. It can be designed to look like standard power line equipment such as insulators, cable splice and the like and can be installed at remote areas and along roads. The ability to use data cell phone technology provides communications capabilities in remote areas and enables control of the systems from remote locations around the world. The system can use satellite and other communications networks, as desired. Thus, operators and others such as law enforcement and security specialists can receive data and communications from multiple systems via cellular, satellite, and other communications networks to monitor areas of interest remotely and respond to incidents or targets of interest that are detected and tracked by the systems. An operator at a remote base of operation can receive data and control operations of one or more systems remotely or others such as law enforcement agents can receive data remotely on a PDA or other portable computing device. Having the ability to program specific areas of interest and configure HVPM-S systems to monitor specific events and phenomena enables defense, law enforcement, security, and other forces to monitor the precise events of interest and to receive alerts when specific conditions are detected. In addition, the HVPM-S system can record and store data locally and transmit P-ISR data to a remote location where it can be recorded and stored for later analysis or use.

The foregoing disclosure has been presented for purposes of illustration and description and is not intended to be exhaustive or to limit the disclosure and the inventions disclosed therein to the various embodiments and forms disclosed herein. Persons skilled in the art will realize and appreciate that many modifications and variations are possible in light of the above teaching. The disclosed embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A multi-sensor system comprising:
a latching mechanism that includes a stationary core, a movable core, a stationary core housing attached to the stationary core, a movable core housing attached to the movable core, and an actuator connected to the stationary core housing and the movable core housing, wherein the stationary core housing is movably attached to the movable core housing and the actuator can be operated to move the movable core toward the stationary core for securing the multi-sensor system to a power line so that the stationary core and/or the movable core can draw electrical power from the power line inductively; and a sensor housing connected to the latching mechanism wherein the sensor housing houses a camera and one or more sensors, a communications device for transmitting data to and receiving control information from a remote location via a communications network, a processor for controlling the camera, sensors, and communications device, and a power system for converting electrical energy drawn inductively from the power line to a lower voltage direct current for powering the camera, sensors, communications device, and processor;

wherein the stationary core of the movable core includes two or more secondary coil windings, each of which secondary coil windings outputs a different secondary voltage for powering the camera, sensors, processor, and communications device in the sensor housing; and the system includes a switch for shorting a connection between the secondary core windings and the power system so the movable core can be moved away from the stationary core via the actuator.

2. The multi-sensor system of claim 1, wherein the power line has a voltage in a range of less than about 100 kV and further wherein the sensor housing includes a battery for storing electrical energy produced by the power system for powering the camera, sensors, processor, and communications device.

3. The multi-sensor system of claim 1, wherein the stationary core and the movable core each include a longitudinal inner channel and the stationary core housing and the movable core housing include cutouts that are aligned with the inner channels of the stationary core and the movable core and engage the power line to position the power line within the inner channels of the stationary and the movable cores when the multi-sensor system is mounted to the power line.

4. The multi-sensor system of claim 3, wherein the sensor housing is filled with nitrogen to prevent fogging of the sensor housing.

5. The multi-sensor system of claim 1, wherein the camera includes a target detection and tracking system that automatically identifies targets of interest according to user-specified criteria in selected detection regions and tracks those targets while notifying an operator at a remote location of the detection and tracking activity.

6. The multi-sensor system of claim 1, wherein the camera comprises one or more of a CCD, infrared, or night vision camera and may include a microphone and speaker for two-way communication and detection of audio events, and the sensors comprise one or more of a vibration, magnetic, acoustic, metal, nuclear, chemical, biological, infrared, heat, motion, or sound sensor and further wherein the system can transmit data obtained by the camera, microphone, and sensors to a remote location via a cellular, satellite, or other communications network.

7. The multi-sensor system of claim 1, wherein the communications device comprises a cellular modem, cellular telephone, satellite link, or other communications device that enables communications over a cellular, satellite, or other communications network that is accessible by the system and that can be accessed from a remote location.

8. The multi-sensor system of claim 1, wherein the multi-sensor system provides persistent intelligence, surveillance, and reconnaissance for days, months, or years and can comprise multiple multi-sensor systems that are networked together and communication with a remote location via a communications network and further wherein the systems can be designed to appear as power line equipment such as transformers and insulators.

9. The multi-sensor system of claim 1, wherein the camera and sensors provide infrared detection capability, night vision, two-way audio, panning, tilting, and zooming vision features, and vibration, magnetic, acoustic, metal nuclear, biological, heat, motion, sound, and combinations thereof.

10. The multi-sensor system of claim 1, wherein the stationary core and the movable core include core faces that are covered with a layer of electrically-conductive material and inserted into rubber boots.

11. The multi-sensor system of claim 1, wherein the power system converts electrical energy drawn inductively from the power line into two or more lower voltage direct currents for powering the camera, sensors, processor, and communications device in the sensor housing.

12. The multi-sensor system of claim 1, further comprising metal oxide varistors that are inserted between terminals of each secondary coil winding to provide over-voltage protection.

13. A method of providing persistent intelligence, surveillance, and reconnaissance comprises:
    attaching the multi-sensor system of claim 1 to a power line;
    drawing electrical power from the power line inductively;
    converting the electrical power from the power line to a lower voltage direct current; and
    powering a camera, sensors, a processor, and communications equipment to provide persistent intelligence, surveillance, and reconnaissance for up to 24 hours a day, seven days a week, and 365 days a year within the area around the multi-sensor system;
    the method further comprising the steps of sensing activities and events in a region around the multi-sensor system, detecting and tracking targets, and transmitting the results of the sensing activities and the detecting and tracking activities to a remote location via the communications network for analysis; and
        wherein the step of detecting targets includes the steps of designating detection regions for surveillance, recording the terrain and environment around each detection region to remove background noise, detecting targets at each detection region, adding targets to a new targets list, and transmitting the new target to at least a remote operator.

14. The method of claim 13, further comprising the steps of transmitting data obtained by the camera and the sensors to a remote location via the communications equipment and a communications network and receiving control information from the remote location at the multi-sensor system to control areas of interest that are monitored by the system.

15. The method of claim 13, further comprising the step of storing the converted lower voltage direct current electrical energy in a battery or other storage device for later use in powering the camera, sensors, processor, and communications equipment.

16. The method of claim 13, wherein the step of converting the electrical power to a lower voltage and direct current comprises converting the electrical power to more than one lower voltage direct currents to power the camera, sensors, processor, and communications equipment.

17. The method of claim 13, wherein the step of tracking targets comprises the steps of predicting the target's next location, tracking the target's movement, updating the prediction of the target's location, and continuing to track the target or dropping the target from the new targets list.

\* \* \* \* \*